US012351661B2

(12) United States Patent
Matsumoto et al.

(10) Patent No.: US 12,351,661 B2
(45) Date of Patent: Jul. 8, 2025

(54) MALEIMIDE-BASED COPOLYMER AND RESIN COMPOSITION

(71) Applicant: Denka Company Limited, Tokyo (JP)

(72) Inventors: Masanori Matsumoto, Tokyo (JP); Kohei Nishino, Tokyo (JP)

(73) Assignee: Denka Company Limited, Tokyo (JP)

( * ) Notice: Subject to any disclaimer, the term of this patent is extended or adjusted under 35 U.S.C. 154(b) by 85 days.

(21) Appl. No.: 18/040,297

(22) PCT Filed: Jun. 8, 2021

(86) PCT No.: PCT/JP2021/021771
§ 371 (c)(1),
(2) Date: Feb. 2, 2023

(87) PCT Pub. No.: WO2022/044480
PCT Pub. Date: Mar. 3, 2022

(65) Prior Publication Data
US 2024/0279372 A1    Aug. 22, 2024

(30) Foreign Application Priority Data

Aug. 31, 2020 (JP) ................................. 2020-145428

(51) Int. Cl.
| | | |
|---|---|---|
| *C08F 212/08* | (2006.01) | |
| *C08L 9/06* | (2006.01) | |
| *B29C 65/18* | (2006.01) | |
| *B29K 25/00* | (2006.01) | |
| *B29K 35/00* | (2006.01) | |
| *B29K 79/00* | (2006.01) | |
| *B29K 105/00* | (2006.01) | |

(52) U.S. Cl.
CPC ............. *C08F 212/08* (2013.01); *C08L 9/06* (2013.01); *B29C 65/18* (2013.01); *B29K 2025/00* (2013.01); *B29K 2035/00* (2013.01); *B29K 2079/08* (2013.01); *B29K 2105/0002* (2013.01); *B29K 2105/0085* (2013.01); *C08L 2205/06* (2013.01)

(58) Field of Classification Search
CPC .......... C08F 212/08; C08L 9/06; B29C 65/02; B29C 65/18; B29C 65/20
USPC ........................................................ 156/60
See application file for complete search history.

(56) References Cited

U.S. PATENT DOCUMENTS

2011/0024038 A1* 2/2011 Mori ...................... B29C 66/80
                                                         156/497
2020/0207971 A1   7/2020 Kamata
2020/0369813 A1  11/2020 Matsumoto et al.

FOREIGN PATENT DOCUMENTS

| CN | 101305048 A | 11/2008 |
|---|---|---|
| CN | 110198988 A | 9/2019 |
| EP | 0 541 797 A1 | 5/1993 |
| EP | 2 388 282 A1 | 11/2011 |
| JP | H02-004810 A | 1/1990 |
| JP | H06-093044 A | 4/1994 |
| JP | H09-012902 A | 1/1997 |
| JP | H09-221522 A | 8/1997 |
| JP | H11-158215 A | 6/1999 |
| JP | H11-199727 A | 7/1999 |
| JP | 2001-207000 A | 7/2001 |
| JP | 2002-096394 A | 4/2002 |
| JP | 2002-121398 A | 4/2002 |
| JP | 2004-182835 A | 7/2004 |
| JP | 2009-155421 A | 7/2009 |
| JP | 2009-191096 A | 8/2009 |
| WO | WO 2018/139087 A1 | 8/2018 |
| WO | WO 2019/138996 A1 | 7/2019 |

OTHER PUBLICATIONS

European Patent Office, Extended European Search Report issued in European Patent Application No. 21860911.3 (Dec. 1, 2023).
The International Bureau of WIPO, International Preliminary Report on Patentability issued in International Application No. PCT/JP2021/021771 (Mar. 9, 2023).
India Patent Office, Examination Report issued in Indian Application No. 202347002777 (Oct. 26, 2023).
Japan Patent Office, International Search Report issued in International Application No. PCT/JP2021/021771 (Jul. 27, 2021).

* cited by examiner

*Primary Examiner* — James D Sells
(74) *Attorney, Agent, or Firm* — Leydig, Voit & Mayer, Ltd.

(57) ABSTRACT

A maleimide-based copolymer containing: 40% to 65% by mass of an aromatic vinyl-based monomer unit; and 35% to 60% by mass of a maleimide-based monomer unit, in which a residual amount of an aromatic vinyl-based monomer is 200 to 2000 ppm by mass, and a residual amount of a maleimide-based monomer is 30 to 400 ppm by mass.

8 Claims, No Drawings

MALEIMIDE-BASED COPOLYMER AND RESIN COMPOSITION

CROSS-REFERENCE TO RELATED APPLICATIONS

This patent application is the U.S. national phase of International Application No. PCT/JP2021/021771, filed on Jun. 8, 2021, which claims the benefit of Japanese Patent Application No. 2020-145428, filed Aug. 31, 2020, the disclosures of which are incorporated herein by reference in their entireties for all purposes.

TECHNICAL FIELD

The present invention relates to a maleimide-based copolymer, a stringing inhibitor composed of the maleimide-based copolymer, a resin composition containing the maleimide-based copolymer, a molded product containing the maleimide-based copolymer, and a method for manufacturing a molded product containing the maleimide-based copolymer.

BACKGROUND ART

Conventionally, resins such as ABS resins have been widely used for automobiles, home electronics, OA equipment, housing building materials, daily necessities, and the like by taking advantage of its excellent mechanical strength, external appearance, chemical resistance, moldability, and the like.

Hot plate welding is widely used for joining of resin products. In hot plate welding, for example, each of two resin surfaces is melted by a hot plate, and the melted resin surfaces are brought together and welded to join the two resin surfaces to each other.

In hot plate welding, when a resin surface is pulled and separated from a hot plate, a so-called stringing phenomenon may occur in which the resin is pulled to be stretched into a stringy shape. When this stringing phenomenon occurs, this causes problems in that a stringy shaped material adheres to the surface of a molded product, resulting in poor external appearance, or that workability is noticeably decreased. In order to ameliorate this stringing phenomenon, for example, Patent Literature 1 discloses a method of adding a specific amount of a fluororesin to a thermoplastic resin.

CITATION LIST

Patent Literature

[Patent Literature 1] Japanese Unexamined Patent Publication No. H09-12902

SUMMARY OF INVENTION

Technical Problem

An object of the present invention is to provide a maleimide-based copolymer, which is capable of obtaining both an effect of imparting heat resistance and an effect of inhibiting a stringing phenomenon when performing hot plate welding, by being added to a thermoplastic resin while inhibiting an increase in a yellowness index. Another object of the present invention is to provide a stringing inhibitor composed of the above-mentioned maleimide-based copolymer and capable of inhibiting a stringing phenomenon when performing hot plate welding of thermoplastic resins. Still another object of the present invention is to provide a resin composition which contains the above-mentioned maleimide-based copolymer and in which a stringing phenomenon is inhibited when performing hot plate welding. Still another object of the present invention is to provide a molded product containing the above-mentioned maleimide-based copolymer, and a method for manufacturing the same.

Solution to Problem

One aspect of the present invention relates to a maleimide-based copolymer containing: 40% to 65% by mass of an aromatic vinyl-based monomer unit; and 35% to 60% by mass of a maleimide-based monomer unit, in which a residual amount of an aromatic vinyl-based monomer is 200 to 2000 ppm by mass, and a residual amount of a maleimide-based monomer is 30 to 400 ppm by mass.

The maleimide-based copolymer according to one aspect may further contain an unsaturated dicarboxylic acid-based monomer unit, in which the content of the unsaturated dicarboxylic acid-based monomer unit may be 10% by mass or less.

The maleimide-based copolymer according to one aspect may further contain a vinyl cyanide-based monomer unit, in which the content of the vinyl cyanide-based monomer unit may be 5% to 20% by mass.

Another aspect of the present invention relates to a stringing inhibitor composed of the above-mentioned maleimide-based copolymer, in which the stringing inhibitor inhibits stringing of a resin composition when performing hot plate welding.

Still another aspect of the present invention relates to a resin composition containing: the above-mentioned maleimide-based copolymer; and a thermoplastic resin.

In the resin composition according to one aspect, the content of the above-mentioned maleimide-based copolymer may be 5% to 40% by mass, and the content of the above-mentioned thermoplastic resin may be 60% to 95% by mass.

The resin composition according to one aspect may be for hot plate welding.

Still another aspect of the present invention relates to a method for manufacturing a molded product, the method including a step of joining a first resin surface and a second resin surface to each other by hot plate welding, in which at least one of the above-mentioned first resin surface and the above-mentioned second resin surface contains the above-mentioned resin composition.

Still another aspect of the present invention relates to a molded product including a welded part at which a first resin surface and a second resin surface are welded, in which at least one of the above-mentioned first resin surface and the above-mentioned second resin surface contains the above-mentioned resin composition.

Advantageous Effects of Invention

According to the present invention, a maleimide-based copolymer, which is capable of obtaining both an effect of imparting heat resistance and an effect of inhibiting a stringing phenomenon when performing hot plate welding, by being added to a thermoplastic resin while inhibiting an increase in a yellowness index is provided. According to the present invention, a stringing inhibitor composed of the above-mentioned maleimide-based copolymer and capable of inhibiting a stringing phenomenon when performing hot plate welding of thermoplastic resins is further provided. According to the present invention, a resin composition which contains the above-mentioned maleimide-based copolymer and in which a stringing phenomenon is inhibited when performing hot plate welding is still further provided. According to the present invention, a molded product containing the above-mentioned maleimide-based copolymer, and a method for manufacturing the same are still further provided.

DESCRIPTION OF EMBODIMENTS

Preferred embodiments of the present invention will be described in detail below.
(Maleimide-Based Copolymer)

A maleimide-based copolymer of the present embodiment contains 40% to 65% by mass of an aromatic vinyl-based monomer unit, and 35% to 60% by mass of a maleimide-based monomer unit. Furthermore, in the maleimide-based copolymer of the present embodiment, the residual amount of an aromatic vinyl-based monomer is 200 to 2000 ppm by mass, and the residual amount of a maleimide-based monomer is 30 to 400 ppm by mass.

The maleimide-based copolymer of the present embodiment has a predetermined amount of the aromatic vinyl-based monomer unit and a predetermined amount of the maleimide-based monomer unit, and the residual amount of the aromatic vinyl-based monomer and the maleimide-based monomer is adjusted to within a predetermined range. Therefore, when the maleimide-based copolymer of the present embodiment is added to a thermoplastic resin, discoloration is sufficiently inhibited, making an effect of imparting heat resistance to a thermoplastic resin excellent. Furthermore, when the maleimide-based copolymer of the present embodiment is added to a thermoplastic resin, a stringing phenomenon when performing hot plate welding can be significantly inhibited. That is, when the maleimide-based copolymer of the present embodiment is mixed with a thermoplastic resin, this makes it possible to provide a resin composition in which a yellowness index is sufficiently low, heat resistance is excellent, and a stringing phenomenon when performing hot plate welding is significantly inhibited.

Although the reason why the above-mentioned effect is exhibited is not necessarily clear, it is thought that by setting the residual amount of the monomer in the maleimide-based copolymer having the specific composition within the above-mentioned specific range, the residual monomer can effectively inhibit stringing of the resin composition while maintaining the sufficient heat resistance and the yellowness index of the resin composition, which makes it possible to obtain all of the excellent yellowness index, the effect of imparting heat resistance, and the effect of inhibiting a stringing phenomenon.

The structure of the maleimide-based copolymer of the present embodiment is not particularly limited, and a copolymer having an arbitrary structure containing an aromatic vinyl-based monomer unit and a maleimide-based monomer unit can be used. That is, although copolymers are broadly classified into four structures, which are random copolymers, alternating copolymers, periodic copolymers, and block copolymers, and one type of block copolymer is a graft copolymer (copolymers having a branched structure in which heterogeneous branched polymer chains are bonded to a polymer chain serving as a trunk), a copolymer of any structure may be used.

<Aromatic Vinyl-Based Monomer Unit>

The aromatic vinyl-based monomer unit indicates a structural unit (repeating unit) derived from an aromatic vinyl-based monomer. The aromatic vinyl-based monomer may be a monomer having a carbon-carbon double bond and at least one aromatic ring directly bonded to the double bond, and is preferably a monomer in which a group represented by —C(R)=CH$_2$ (where R is a hydrogen atom or a methyl group) is bonded to an aromatic ring. The maleimide-based copolymer of the present embodiment may have only one type of aromatic vinyl-based monomer unit, or may have two or more types thereof.

The aromatic ring of the aromatic vinyl-based monomer unit is preferably a benzene ring or a naphthalene ring, and is more preferably a benzene ring.

Examples of aromatic vinyl-based monomers include
styrene-based monomers selected from the group consisting of styrene and styrene derivatives in which some of hydrogen atoms of styrene are substituted with substituents, and
vinylnaphthalene-based monomers selected from the group consisting of 1-vinylnaphthalene, 2-vinylnaphthalene, and vinylnaphthalene derivatives in which some of hydrogen atoms of these are substituted with substituents.

Examples of substituents of each derivative include halogen atoms (for example, fluorine atoms, chlorine atoms, bromine atoms, or iodine atoms, preferably fluorine atoms or chlorine atoms), and alkyl groups (for example, alkyl groups having 1 to 16 carbon atoms, preferably alkyl groups having 1 to 8 carbon atoms, and more preferably alkyl groups having 1 to 4 carbon atoms). These groups may further have a substituent (for example, the above-mentioned substituents).

The styrene-based monomer is preferably a compound selected from the group consisting of styrene, α-methylstyrene, p-methylstyrene, ethylstyrene, tert-butylstyrene, chlorostyrene, and dichlorostyrene, is more preferably a compound selected from the group consisting of styrene and α-methylstyrene, and is further preferably styrene.

The vinylnaphthalene-based monomer is preferably a compound selected from the group consisting of 1-vinylnaphthalene and 2-vinylnaphthalene, and is more preferably 2-vinylnaphthalene.

The styrene-based monomer is preferable as the aromatic vinyl-based monomer. That is, a styrene-based monomer unit is preferable as the aromatic vinyl-based monomer unit.

The content of the aromatic vinyl-based monomer unit in the maleimide-based copolymer is 40% by mass or more, is preferably 43% by mass or more, is more preferably 45% by mass or more, and is further preferably 47% by mass or more. Thereby, the flowability of the resin composition at the time of melting tends to be further improved, which further improves moldability. In addition, this tends to further improve the impact resistance of the resin composition.

In addition, the content of the aromatic vinyl-based monomer unit in the maleimide-based copolymer is 65% by mass or less, is preferably 63% by mass or less, is more preferably 60% by mass or less, is further preferably 57% by mass or less, and is still further preferably 55% by mass or less. This tends to further improve the effect of imparting heat resistance to the maleimide-based copolymer. That is, the content of the aromatic vinyl-based monomer unit in the maleimide-based copolymer may be 40% to 65% by mass, 40% to 63% by mass, 40% to 60% by mass, 40% to 57% by mass, 40% to 55% by mass, 43% to 65% by mass, 43% to 63% by mass, 43% to 60% by mass, 43% to 57% by mass, 43% to 55% by mass, 45% to 65% by mass, 45% to 63% by mass, 45% to 60% by mass %, 45% to 57% by mass, 45% to 55% by mass, 47% to 65% by mass, 47% to 63% by mass, 47% to 60% by mass, 47% to 57% by mass, or 47% to 55% by mass, for example.

<Maleimide-Based Monomer Unit>

The maleimide-based monomer unit indicates a structural unit (repeating unit) derived from a maleimide-based monomer. The maleimide-based monomer may be, for example, a monomer having at least one group represented by Formula (I). The maleimide-based monomer unit does not necessarily have to be formed from a maleimide-based monomer, and may be formed by imidizing the below-described unsaturated dicarboxylic acid-based monomer unit with ammonia or a primary amine. The maleimide-based copolymer of the present embodiment may have only one maleimide-based monomer unit, or may have two or more maleimide-based monomer units.

[Chem. 1]

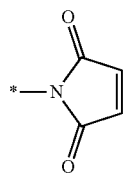

(1)

Examples of the maleimide-based monomers include maleimides, and N-substituted maleimides (that is, maleimides having a substituent on the nitrogen atom). Examples of the substituent on the nitrogen atom of the N-substituted maleimides include alkyl groups (for example, alkyl groups having 1 to 18 carbon atoms, preferably alkyl groups having 1 to 8 carbon atoms, and more preferably alkyl groups having 1 to 4 carbon atoms), cycloalkyl groups (for example, cycloalkyl groups having 3 to 9 carbon atoms, preferably cycloalkyl groups having 4 to 8 carbon atoms, and more preferably cycloalkyl groups having 5 to 7 carbon atoms), and aryl groups (for example, aryl groups having 6 to 10 carbon atoms, preferably a phenyl group). These groups may further have substituents (for example, the above-mentioned substituents, halogen atoms (for example, fluorine atoms, chlorine atoms, bromine atoms, or iodine atoms, preferably fluorine atoms or chlorine atoms), alkoxy groups (for example, alkoxy groups having 1 to 18 carbon atoms, preferably alkoxy groups having 1 to 8 carbon atoms, and more preferably alkoxy groups having 1 to 4 carbon atoms), and the like).

Examples of N-substituted maleimides include
N-alkylmaleimides such as N-methylmaleimide, N-ethylmaleimide, N-n-butylmaleimide, and N-n-octylmaleimide;
N-cycloalkylmaleimides such as N-cyclohexylmaleimide; and
N-arylmaleimides such as N-phenylmaleimide and N-(4-methoxyphenyl)maleimide.

As the maleimide-based monomer, an N-substituted maleimide is preferable, an N-arylmaleimide is more preferable, and an N-phenylmaleimide is further preferable. That is, a maleimide-based monomer unit (iii) is preferably an N-substituted maleimide unit, is more preferably an N-arylmaleimide unit, and is further preferably an N-phenylmaleimide unit.

The maleimide-based monomer unit may be formed by polymerization of maleimide-based monomers, or may be formed by imidization of unsaturated dicarboxylic acid-based monomer units (for example, maleic acid anhydride unit). The unsaturated dicarboxylic acid-based monomer unit may be an unsaturated dicarboxylic acid-based monomer unit to be described later. The imidization can be performed by reacting the unsaturated dicarboxylic acid-based monomer unit with ammonia or a primary amine, for example.

The content of the maleimide-based monomer unit in the maleimide-based copolymer is 35% by mass or more, is preferably 37% by mass or more, is more preferably 40% by mass or more, is further preferably 43% by mass or more, and is still further preferably 45% by mass or more. This tends to further improve the effect of imparting heat resistance to the maleimide-based copolymer.

In addition, the content of the maleimide-based monomer unit in the maleimide-based copolymer is 60% by mass or less, is preferably 57% by mass or less, is more preferably 55% by mass or less, and is further preferably 53% by mass or less. Thereby, the flowability of the resin composition at the time of melting tends to be further improved, which further improves moldability. In addition, this tends to further improve the impact resistance of the resin composition. That is, the content of the maleimide-based monomer unit in the maleimide-based copolymer may be 35% to 60% by mass, 35% to 57% by mass, 35% to 55% by mass, 35% to 53% by mass, 37% to 60% by mass, 37% to 57% by mass, 37% to 55% by mass, 37% to 53% by mass, 40% to 60% by mass, 40% to 57% by mass, 40% to 55% by mass, 40% to 53% by mass, 43% to 60% by mass, 43% to 57% by mass, 43% to 55% by mass, 43% to 53% by mass, 45% to 60% by mass, 45% to 57% by mass, 45% to 55% by mass, or 45% to 53% by mass, for example.

The maleimide-based copolymer of the present embodiment is mainly composed of the aromatic vinyl-based monomer unit and the maleimide-based monomer unit. The total content of the aromatic vinyl-based monomer unit and the maleimide-based monomer unit in the maleimide-based copolymer is 75% by mass or more, is preferably 80% by mass or more, is more preferably 85% by mass or more, is further preferably 90% by mass or more, and may be 95% by mass or more, may be 97% by mass or more, or may be 100% by mass, for example.

The maleimide-based copolymer of the present embodiment may further have monomer units other than the aromatic vinyl-based monomer unit and the maleimide-based monomer unit. For example, the maleimide-based copolymer of the present embodiment may further have an unsaturated dicarboxylic acid-based monomer unit. In addition, the maleimide-based copolymer of the present embodiment may further have a vinyl cyanide-based monomer unit.

<Unsaturated Dicarboxylic Acid-Based Monomer Unit>

The unsaturated dicarboxylic acid-based monomer unit indicates a structural unit (repeating unit) derived from an unsaturated dicarboxylic acid-based monomer. Examples of the unsaturated dicarboxylic acid-based monomer include unsaturated dicarboxylic acids and their anhydrides (unsaturated dicarboxylic acid anhydrides). The maleimide-based copolymer of the present embodiment may have only one type of unsaturated dicarboxylic acid-based monomer, or may have two or more types thereof.

Examples of the unsaturated dicarboxylic acids include maleic acid and itaconic acid. Examples of the unsaturated dicarboxylic acid anhydrides include maleic acid anhydride and itaconic acid anhydride.

As the unsaturated dicarboxylic acid-based monomer unit, a maleic acid-based monomer unit (maleic acid unit or maleic acid anhydride unit) is preferable.

The content of the unsaturated dicarboxylic acid-based monomer unit in the maleimide-based copolymer may be 15% by mass or less, for example. From the viewpoint of further improving the heat stability of the resin composition and significantly inhibiting the generation of degraded gas at the time of thermal processing, the content is preferably 10% by mass or less, is more preferably 7% by mass or less, is further preferably 5% by mass or less, is still further preferably 3% by mass or less, or may be 0% by mass.

When the maleimide-based copolymer contains the unsaturated dicarboxylic acid-based monomer unit, the content of the unsaturated dicarboxylic acid-based monomer unit in the maleimide-based copolymer may be 0.1% by mass or more, for example. From the viewpoint of easily improving the adhesiveness with a coating film formed by painting, the content is preferably 0.3% by mass or more, is more preferably 0.5% by mass or more, or may be 0.7% by mass or more or 1% by mass or more. That is, the content of the unsaturated dicarboxylic acid-based monomer unit in the maleimide-based copolymer may be 0% to 15% by mass, 0% to 10% by mass, 0% to 7% by mass, 0% to 5% by mass, 0% to 3% by mass, 0.1% to 15% by mass, 0.1% to 10% by mass, 0.1% to 7% by mass, 0.1% to 5% by mass, 0.1% to 3% by mass, 0.3% to 15% by mass, 0.3% to 10% by mass, 0.3% to 7% by mass, 0.3% to 5% by mass, 0.3% to 3% by mass, 0.5% to 15% by mass, 0.5% to 10% by mass, 0.5% to 7% by mass, 0.5% to 5% by mass, 0.5% to 3% by mass, 0.7% to 15% by mass, 0.7% to 10% by mass, 0.7% to 7% by mass, 0.7% to 5% by mass, 0.7% to 3% by mass, 1% to 15% by mass, 1% to 10% by mass, 1% to 7% by mass, 1% to 5% by mass, or 1% to 3% by mass.

The unsaturated dicarboxylic acid-based monomer unit in the maleimide-based copolymer may be formed by polymerizing unsaturated dicarboxylic acid-based monomers such that the content thereof falls within the above-mentioned range. In addition, the unsaturated dicarboxylic acid-based monomer unit in the maleimide-based copolymer may be an unsaturated dicarboxylic acid-based monomer unit that has not reacted in the imidization reaction for formation of the maleimide-based monomer unit.

<Vinyl Cyanide-Based Monomer Unit>

The vinyl cyanide-based monomer unit indicates a structural unit (repeating unit) derived from a vinyl cyanide-based monomer. The vinyl cyanide-based monomer may be a monomer having a carbon-carbon double bond and at least one cyano group directly bonded to the double bond.

Examples of the vinyl cyanide-based monomer include acrylonitrile, methacrylonitrile, fumaronitrile, and α-chloroacrylonitrile.

Acrylonitrile is preferable as the vinyl cyanide-based monomer. That is, an acrylonitrile unit is preferable as the vinyl cyanide-based monomer unit.

The content of the vinyl cyanide-based monomer unit in the maleimide-based copolymer may be 20% by mass or less, for example. From the viewpoint of easily preventing discoloration of the maleimide-based copolymer, the content is preferably 15% by mass or less, is more preferably 13% by mass or less, further preferably 10% by mass or less, and may be 0% by mass.

When the maleimide-based copolymer contains the vinyl cyanide-based monomer unit, the content of the vinyl cyanide-based monomer unit in the maleimide-based copolymer may be 5% by mass or more, or may be 7% by mass or more, for example, from the viewpoint of easily improving the chemical resistance of the resin composition. That is, the content of vinyl cyanide-based monomer unit in the maleimide-based copolymer may be 0% to 20% by mass, 0% to 15% by mass, 0% to 13% by mass, 0% to 10% by mass, 5% to 20% by mass, 5% to 15% by mass, 5% to 13% by mass, 5% to 10% by mass, 7% to 20% by mass, 7% to 15% by mass, 7% to 13% by mass, or 7% to 10% by mass, for example.

<Other Monomer Units>

The maleimide-based copolymer of the present embodiment may further have monomer units other than those described above. Examples of the other monomer units include methyl (meth)acrylate units, ethyl (meth)acrylate units, butyl (meth)acrylate units, (meth)acrylic acid units, and (meth)acrylic acid amide units.

The content of the other monomer units in the maleimide-based copolymer is 5% by mass or less, is preferably 3% by mass or less, is more preferably 1% by mass or less, or may be 0% by mass, for example.

In the present specification, the content of each of the monomer units can be measured by a $^{13}$C-NMR method using the following device and measurement conditions.

Device name: JNM-ECX series FT-NMR (manufactured by JEOL Ltd.)
    Solvent: deuterated chloroform
    Concentration: 2.5% by mass
    Temperature: 27° C.
    Accumulated times: 8,000 times <Residual Amount of Monomer>

In the maleimide-based copolymer of the present embodiment, the aromatic vinyl-based monomer and the maleimide-based monomer may remain. In other words, the maleimide-based copolymer of the present embodiment may be present as a composition containing the aromatic vinyl-based monomer and the maleimide-based monomer. That is, it can be said that the present embodiment relates to a composition containing the maleimide-based copolymer, a vinyl-based monomer, and a maleimide-based monomer.

In the maleimide-based copolymer of the present embodiment, the residual amount ($C_1$) of the aromatic vinyl-based monomer is 200 ppm by mass or more, thereby significantly inhibiting a stringing phenomenon in the resin composition. From the viewpoint of more significantly exhibiting a stringing inhibiting effect, the residual amount ($C_1$) of the aromatic vinyl-based monomer may be 300 ppm by mass or more, 400 ppm by mass or more, 500 ppm by mass or more, 600 ppm by mass or more, 700 ppm by mass or more, 800 ppm by mass or more, 900 ppm by mass or more, or 1000 ppm by mass or more.

In addition, the residual amount ($C_1$) of the aromatic vinyl-based monomer is 2000 ppm by mass or less, thereby significantly inhibiting the generation of a volatile-matter content at the time of heating the resin composition. From the viewpoint of more significantly inhibiting the generation of a volatile-matter content, the residual amount ($C_1$) of the aromatic vinyl-based monomer may be 1800 ppm by mass or less, 1600 ppm by mass or less, 1400 ppm by mass or less, 1200 ppm by mass or less, or 1100 ppm by mass or less. That is, the residual amount ($C_1$) of the aromatic vinyl-based monomer may be 300 to 1800 ppm by mass, 300 to 1600 ppm by mass, 300 to 1400 ppm by mass, 300 to 1200 ppm by mass, 300 to 1100 ppm by mass, 400 to 1800 ppm by mass, 400 to 1600 ppm by mass, 400 to 1400 ppm by mass, 400 to 1200 ppm by mass, 400 to 1100 ppm by mass, 500 to 1800 ppm by mass, 500 to 1600 ppm by mass, 500 to 1400 ppm by mass, 500 to 1200 by mass ppm by mass, 500 to 1100 ppm by mass, 600 to 1800 ppm by mass, 600 to 1600 ppm by mass, 600 to 1400 ppm by mass, 600 to 1200 ppm by mass, 600 to 1100 ppm by mass, 700 to 1800 ppm by mass, 700 to 1600 ppm by mass, 700 to 1400 ppm by mass, 700 to 1200 ppm by mass, 700 to 1100 ppm by mass, 800 to 1800 ppm by mass, 800 to 1600 ppm by mass, 800 to 1400 ppm by mass, 800 to 1200 ppm by mass, 800 to 1100 ppm by mass, 900 to 1800 ppm by mass, 900 to 1600 ppm by mass, 900 to 1400 ppm by mass, 900 to 1200 ppm by mass, 900 to 1100 ppm by mass, 1000 to 1800 ppm by mass, 1000 to 1600 ppm by mass, 1000 to 1400 ppm by mass, 1000 to 1200 ppm by mass, or 1000 to 1100 ppm by mass, for example.

Examples of the aromatic vinyl-based monomer remaining in the maleimide-based copolymer include aromatic vinyl-based monomers capable of forming the above-mentioned aromatic vinyl-based monomer units.

In the maleimide-based copolymer of the present embodiment, the residual amount ($C_2$) of the maleimide-based monomer is 30 ppm by mass or more, thereby significantly inhibiting the stringing phenomenon in the resin composition. From the viewpoint of more significantly exhibiting the stringing inhibiting effect, the residual amount ($C_2$) of the maleimide-based monomer may be 50 ppm by mass or more, 60 ppm by mass or more, 70 ppm by mass or more, 80 ppm by mass or more, 90 ppm by mass or more, 100 ppm by mass or more, or 110 ppm by mass or more.

In addition, the residual amount ($C_2$) of the maleimide-based monomer is 400 ppm by mass or less, thereby significantly inhibiting the generation of a volatile-matter content at the time of heating the resin composition and the deterioration of the color tone of the resin composition. From the viewpoint of more significantly inhibiting the generation of a volatile-matter content and the deterioration of the color tone, the residual amount ($C_2$) of the maleimide-based monomer may be 380 ppm by mass or less, 360 ppm by mass or less, 340 ppm by mass or less, and 320 ppm by mass or less, or 300 ppm by mass or less. That is, the residual amount ($C_2$) of the maleimide-based monomer may be 30 to 400 ppm by mass, 30 to 380 ppm by mass, 30 to 360 ppm by mass, 30 to 340 ppm by mass, 30 to 320 ppm by mass, 30 to 300 ppm by mass, 50 to 400 ppm by mass, 50 to 380 ppm by mass, 50 to 360 ppm by mass, 50 to 340 ppm by mass, 50 to 320 ppm by mass, 50 to 300 ppm by mass, 60 to 400 ppm by mass, 60 to 380 ppm by mass, 60 to 360 ppm by mass, 60 to 340 ppm by mass, 60 to 320 ppm by mass, 60 to 300 ppm by mass, 70 to 400 ppm by mass, 70 to 380 ppm by mass, 70 to 360 ppm by mass, 70 to 340 ppm by mass, 70 to 320 ppm by mass, 70 to 300 ppm by mass, 80 to 400 ppm by mass, 80 to 380 ppm by mass, 80 to 360 ppm by mass, 80 to 340 ppm by mass, 80 to 320 ppm by mass, 80 to 300 ppm by mass, 90 to 400 ppm by mass, 90 to 380 ppm by mass, 90 to 360 ppm by mass, 90 to 340 ppm by mass, 90 to 320 ppm by mass, 90 to 300 ppm by mass, 100 to 400 ppm by mass, 100 to 380 ppm by mass, 100 to 360 ppm by mass, 100 to 340 ppm by mass, 100 to 320 ppm by mass, 100 to 300 ppm by mass, 110 to 400 ppm by mass, 110 to 380 ppm by mass, 110 to 360 ppm by mass, 110 to 340 ppm by mass, 110 to 320 ppm by mass, or 110 to 300 ppm by mass, for example.

Examples of the maleimide-based monomer remaining in the maleimide-based copolymer include maleimide-based monomers capable of forming the above-mentioned maleimide-based monomer units. The maleimide-based monomer remaining in the maleimide-based copolymer may be a maleimide-based monomer remaining unreacted in the polymerization reaction of the aromatic vinyl-based monomer and the maleimide-based monomer. In addition, the maleimide-based monomer remaining in the maleimide-based copolymer may be one formed from imidization of an unsaturated dicarboxylic acid-based monomer unit that remains unreacted in the polymerization reaction between the aromatic vinyl-based monomer and the unsaturated dicarboxylic acid-based monomer.

In the maleimide-based copolymer of the present embodiment, the total residual amount ($C_1+C_2$) of the aromatic vinyl-based monomer and the maleimide-based monomer is 230 ppm by mass or more, thereby significantly inhibiting the stringing phenomenon in the resin composition. From the viewpoint of more significantly exhibiting the stringing inhibiting effect, the above-mentioned total residual amount ($C_1+C_2$) may be 300 ppm by mass or more, 400 ppm by mass or more, 500 ppm by mass or more, 600 ppm by mass or more, 700 ppm by mass or more, 800 ppm by mass or more, 900 ppm by mass or more, 1000 ppm by mass or more, 1100 ppm by mass or more, or 1200 ppm by mass or more.

Furthermore, the above-mentioned total residual amount ($C_1+C_2$) is 2400 ppm by mass or less, thereby significantly inhibiting the generation of a volatile-matter content at the time of heating the resin composition. From the viewpoint of more significantly inhibiting the generation of a volatile-matter content, the above-mentioned total residual amount ($C_1+C_2$) may be 2200 ppm by mass or less, 2000 ppm by mass or less, 1800 ppm by mass or less, 1600 ppm by mass or less, 1400 ppm by mass or less, 1200 ppm by mass or less, 1000 ppm by mass or less, or 900 ppm by mass or less. That is, the total residual amount ($C_1+C_2$) of the aromatic vinyl-based monomer and the maleimide-based monomer may be 230 to 2400 ppm by mass, 230 to 2200 ppm by mass, 230 to 2000 ppm by mass, 230 to 1800 ppm by mass, 230 to 1600 ppm by mass, 230 to 1400 ppm by mass, 230 to 1200 ppm by mass, 230 to 1000 ppm by mass, 230 to 900 ppm by mass, 300 to 2400 ppm by mass, 300 to 2200 ppm by mass, 300 to 2000 ppm by mass, 300 to 1800 ppm by mass, 300 to 1600 ppm by mass, 300 to 1400 ppm by mass, 300 to 1200 ppm by mass, 300 to 1000 ppm by mass, 300 to 900 ppm by mass, 400 to 2400 ppm by mass, 400 to 2200 ppm by mass, 400 to 2000 ppm by mass, 400 to 1800 ppm by mass, 400 to 1600 ppm by mass, 400 to 1400 ppm by mass, 400 to 1200 ppm by mass, 400 to 1000 ppm by mass, 400 to 900 ppm by mass, 500 to 2400 ppm by mass, 500 to 2200 ppm by mass, 500 to 2000 ppm by mass, 500 to 1800 ppm by mass, 500 to 1600 ppm by mass, 500 to 1400 ppm by mass, 500 to 1200 ppm by mass, 500 to 1000 ppm by mass, 500 to 900 ppm by mass, 600 to 2400 ppm by mass, 600 to 2200 ppm by mass, 600 to 2000 ppm by mass, 600 to 1800 ppm by mass, 600 to 1600 ppm by mass, 600 to 1400 ppm by mass, 600 to 1200 ppm by mass, 600 to 1000 ppm by mass, 600 to 900 ppm by mass, 700 to 2400 ppm by mass, 700 to 2200 ppm by mass, 700 to 2000 ppm by mass, 700 to 1800 ppm by mass, 700 to 1600 ppm by mass, 700 to 1400 ppm by mass, 700 to 1200 ppm by mass, 700 to 1000 ppm by mass, 700 to 900 ppm by mass, 800 to 2400 ppm by mass, 800 to 2200 ppm by mass, 800 to 2000 ppm by mass, 800 to 1800 ppm by mass, 800 to 1600 ppm by mass, 800 to 1400 ppm by mass, 800 to 1200 ppm by mass, 800 to 1000 ppm by mass, 800 to 900 ppm by mass, 900 to 2400 ppm by mass, 900 to 2200 ppm by mass, 900 to 2000 ppm by mass, 900 to 1800 ppm by mass, 900 to 1600 ppm by mass, 900 to 1400 ppm by mass, 900 to 1200 ppm by mass, 900 to 1000 ppm by mass, 1000 to 2400 ppm by mass, 1000 to 2200 ppm by mass, 1000 to 2000 ppm by mass, 1000 to 1800 ppm by mass, 1000 to 1600 ppm by mass, 1000 to 1400 ppm by mass, 1000 to 1200 ppm by mass, 1100 to 2400 ppm by mass, 1100 to 2200 ppm by mass, 1100 to 2000 ppm by mass, 1100 to 1800 ppm by mass, 1100 to 1600 ppm by mass, 1100 to 1400 ppm by mass, 1100 to 1200 ppm by mass, 1200 to 2400 ppm by mass, 1200 to 2200 ppm by mass, 1200 to 2000 ppm by mass, 1200 to 1800 ppm by mass, 1200 to 1600 ppm by mass, or 1200 to 1400 ppm by mass, for example.

In the maleimide-based copolymer of the present embodiment, monomers other than the aromatic vinyl-based monomer and the maleimide-based monomer may remain. Examples of the monomers that may remain include unsaturated dicarboxylic acid-based monomers, vinyl cyanide-based monomers, and the monomers exemplified in <Other monomer units> described above.

In the maleimide-based copolymer of the present embodiment, the residual amount of the monomers can be appropriately adjusted by methods of controlling a polymerization rate, controlling conditions in a monomer removing step, and the like.

In the maleimide-based copolymer of the present embodiment, the residual amount of the monomers other than the aromatic vinyl-based monomer and the maleimide-based monomer is 200 ppm by mass or less. From the viewpoint of more significantly inhibiting the generation of a volatile-matter content at the time of heating the resin composition, the residual amount is preferably 100 ppm by mass or less, is more preferably 50 ppm by mass or less, and may be 0 ppm by mass, for example.

In the present specification, the residual amount of the maleimide-based monomer is measured under the following conditions.
Device name: GC-2010 (manufactured by Shimadzu Corporation)
Column: capillary column DB-5MS (phenylallene polymer)
Temperature: temperature rising analysis is performed at an inlet temperature of 280° C., a detector temperature of 280° C., and a column temperature of 80° C. (initial stage).
(Temperature Rising Analysis Conditions)
80° C.: holding for 12 minutes
80 to 280° C.: temperature rising at 20° C./min for 10 minutes
280° C.: holding for 10 minutes
Detector: FID
Procedure: 0.5 g of a sample is dissolved in 5 ml of a 1,2-dichloroethane solution (0.014 g/L) containing undecane (internal standard substance). Thereafter, 5 ml of n-hexane is added and shaken for 10 to 15 minutes with a shaker to precipitate. Only the supernatant solution is injected into GC in the state where the polymer is precipitated and deposited. An assay value is calculated from the obtained peak surface area of the monomer using the coefficient obtained from the internal standard substance.

In the present specification, 0.3 to 0.4 g of the resin composition is weighed in a 50 mL Erlenmeyer flask and 10 mL of DMF containing an internal standard (cyclopentanol) is added and dissolved as pretreatment, thereby measuring the residual amount of the aromatic vinyl-based monomer under the following conditions.
Device name: GC-12A (manufactured by Shimadzu Corporation)
Detector: FID
Column: 3 m glass column (filler: liquid phase PEG20M+TCEP (15+5))
Temperature: INJ 150° C., DET 150° C., column 115° C.
Injection volume: 1 μL <Physical Properties of Maleimide-Based Copolymer>

The glass transition temperature ($Tg_1$) of the maleimide-based copolymer is 155° C. or higher, is preferably 160° C. or higher, and is more preferably 165° C. or higher, for example. Furthermore, the glass transition temperature ($Tg_1$) of the maleimide-based copolymer is 210° C. or lower, is preferably 205° C. or lower, and is more preferably 200° C. or lower, for example. That is, the glass transition temperature ($Tg_1$) of the maleimide-based copolymer may be 155° C. to 210° C., 155° C. to 205° C., 155° C. to 200° C., 160° C. to 210° C., 160° C. to 205° C., 160° C. to 200° C., 165° C. to 210° C., 165° C. to 205° C., or 165° C. to 200° C., for example. Since the maleimide-based copolymer of the present embodiment has the above-mentioned structure and has such a glass transition temperature, the effect of imparting heat resistance and the stringing inhibiting effect are more significantly exhibited.

In the present specification, the glass transition temperature ($Tg_1$) refers to an extrapolated glass transition onset temperature (Tig) of the maleimide-based copolymer measured by the following device and measurement conditions in accordance with JIS K-7121.
Device name: differential scanning calorimeter Robot DSC6200 (manufactured by Seiko Instruments Inc.)
Temperature rising rate: 10° C./min The weight-average molecular weight (Mw) of the maleimide-based copolymer is 50000 or more, is preferably 70000 or more, and is more preferably 80000 or more, for example. This tends to further improve the impact resistance of the resin composition. In addition, the weight-average molecular weight (Mw) of the maleimide-based copolymer is 170000 or less, is preferably 160000 or less, and is more preferably 150000 or less, for example. Thereby, the flowability of the resin composition at the time of melting tends to be further improved, which further improves moldability. That is, the weight-average molecular weight (Mw) of the maleimide-based copolymer may be 50000 to 170000, 50000 to 160000, 50000 to 150000, 70000 to 170000, 70000 to 160000, 70000 to 150000, 80000 to 170000, 80000 to 160000, or 80000 and 150000.

In addition, in the present specification, the weight-average molecular weight is a value expressed in terms of polystyrene measured by a gel permeation chromatography (GPC), and can be measured under the following conditions.
Measurement device name: SYSTEM-21 Shodex (manufactured by Showa Denko K.K.)
Column: three columns of PLgel MIXED-B (manufactured by Polymer Laboratories Ltd.) in series
Temperature: 40° C.
Detection: differential refractive index
Solvent: tetrahydrofuran
Concentration: 2% by mass
Calibration curve: created using standard polystyrene (PS) (manufactured by Polymer Laboratories Ltd.)

<Method for Manufacturing Maleimide-Based Copolymer>

A method for manufacturing the maleimide-based copolymer is not particularly limited. The maleimide-based copolymer can be manufactured by subjecting a monomer component containing an aromatic vinyl-based monomer and a maleimide-based monomer to a polymerization reaction, for example. In addition, the maleimide-based copolymer can be manufactured by, for example, subjecting a monomer component containing an aromatic vinyl-based monomer and an unsaturated dicarboxylic acid-based monomer to a polymerization reaction to form a polymer (A') having an aromatic vinyl-based monomer unit and an unsaturated dicarboxylic acid-based monomer unit, and modifying (imidizing) at least part of the unsaturated dicarboxylic acid-based monomer unit in the polymer (A) into a maleimide-based monomer unit.

A polymerization reaction method is not particularly limited, and for example, known polymerization methods such as bulk polymerization, solution polymerization, and suspension polymerization may be applied.

The polymerization reaction may be performed by reacting the monomer component and a polymerization initiator. The polymerization initiator is not particularly limited as long as it is an initiator capable of initiating the polymerization reaction of the monomer component, and known polymerization initiators can be used. Examples of the polymerization initiator include organic peroxides and azo-based compounds.

Examples of the organic peroxides include peroxyketal-based organic peroxides such as 1,1-bis(t-butylperoxy)-3,3,5-trimethylcyclohexane, 2,2-bis(4,4-di-t-butylperoxycyclohexyl)propane, and 1,1-bis(t-butylperoxy)cyclohexane; peroxy ester-based organic peroxides such as t-butyl peroxy-2-ethylhexanoate, t-butyl peroxyisopropyl monocarbonate, t-butyl peroxyacetate; and hydroperoxide-based organic peroxides such as diisopropylbenzene hydroperoxide, cumene hydroperoxide, and t-butyl hydroperoxide.

Examples of the azo-based compounds include 2,2-azobisisobutyronitrile, 2,2-azobis(2,4-dimethylvaleronitrile), and 2,2-azobis(2-methylbutyronitrile).

A chain transfer agent or a molecular weight modifier may be used in the polymerization reaction. As the chain transfer agent or molecular weight modifier, known ones can be used without any particular limitation, and for example, mercaptans such as t-dodecylmercaptan and n-dodecylmercaptan, terpinolene, α-methylstyrene dimer, and the like can be used.

Modification of the unsaturated dicarboxylic acid-based monomer unit can be performed by causing the reaction (hereinafter also referred to as modification reaction) of the polymer (A') with ammonia and/or a primary amine, for example.

The reaction temperature for the modification reaction may be 120° C. to 250° C., and is preferably 150° C. to 230° C., for example.

The modification reaction may be caused in the presence of a catalyst. As the catalyst, for example, tertiary amines such as trimethylamine and triethylamine are preferable, and trimethylamine is particularly preferable. The amount of the catalyst may be, for example, 0.01 to 2 parts by weight with respect to 100 parts by weight as the total amount of ammonia and primary amine.

Regarding the polymerization of the polymer (A'), because in the copolymerization of the aromatic vinyl-based monomer and the unsaturated dicarboxylic acid-based monomer, copolymerization properties thereof are strong, the aromatic vinyl-based monomer and the unsaturated dicarboxylic acid-based monomer are likely to be polymerized at the molar ratio of 1:1 at the initial stage of the polymerization. Therefore, for example, when the charged amount (mol) of the aromatic vinyl-based monomer is larger than the charged amount (mol) of the unsaturated dicarboxylic acid-based monomer, and when the total amount is subjected to the reaction from the initial stage of the polymerization, there may be a case in which in the latter stage of the polymerization, a copolymer having a large proportion of an aromatic vinyl-based monomer unit is likely to be generated, and a composition distribution becomes wide, resulting in a deterioration in compatibility with thermoplastic resins.

Therefore, the polymer (A') may be manufactured by performing a polymerization reaction while adding a part of an unsaturated dicarboxylic acid-based monomer to a reaction solution in which an aromatic vinyl-based monomer and the other part of the unsaturated dicarboxylic acid-based monomer has been charged. This makes it easier to obtain a maleimide-based copolymer having a narrow composition distribution and a higher compatibility with thermoplastic resins.

In the manufacturing method of the present embodiment, the reaction speed and the polymerization rate of the polymerization reaction can be controlled according to the polymerization temperature, the polymerization time, the amount of the polymerization initiator, the addition speed of monomers, and the like. For example, the residual amounts of the aromatic vinyl-based monomer and the maleimide-based monomer can be adjusted by controlling the polymerization rate.

The manufacturing method of the present embodiment may include a monomer removing step of removing at least a part of an aromatic vinyl-based monomer unit and a maleimide-based monomer unit from the maleimide-based copolymer in which the residual amount of an aromatic vinyl-based monomer and/or the residual amount of a maleimide-based monomer exceeds a predetermined range, thereby obtaining the maleimide-based copolymer in which the residual amount of the aromatic vinyl-based monomer and the residual amount of the maleimide-based monomer are within a predetermined range.

In the monomer removing step, a method of removing the monomer is not particularly limited, and examples thereof include a method of using a vacuum devolatilization tank with a heater, a method of using a devolatilization extruder with a vent, and a method of a combination thereof.

(Stringing Inhibitor)

A stringing inhibitor of the present embodiment is composed of the above-mentioned maleimide-based copolymer. By adding the stringing inhibitor of the present embodiment to a thermoplastic resin, the stringing phenomenon at the time of hot plate welding of a thermoplastic resin can be inhibited. That is, according to the stringing inhibitor of the present embodiment, addition thereof to a thermoplastic resin makes it possible to obtain a resin composition in which the stringing phenomenon at the time of hot plate welding is inhibited.

The stringing inhibitor of the present embodiment can also impart heat resistance to a thermoplastic resin.

The addition amount of the stringing inhibitor may be, for example, 1% by mass or more with respect to 100% by mass as the total of the thermoplastic resin and the stringing inhibitor. From the viewpoint of significantly inhibiting the stringing phenomenon, the addition amount is preferably 3% by mass or more, is more preferably 5% by mass or more, and is further preferably 10% by mass or more. In addition, the addition amount of the stringing inhibitor may be, for example, 50% by mass or less with respect to 100% by mass as the total of the thermoplastic resin and the stringing inhibitor. From the viewpoint of further improving impact resistance, the addition amount is preferably 40% by mass or less, is more preferably 30% by mass or less, and is further preferably 20% by mass or less. That is, the addition amount of the stringing inhibitor with respect to 100% by mass as the total of the thermoplastic resin and the stringing inhibitor may be 1% to 50% by mass, 1% to 40% by mass, 1% to 30% by mass, 1% to 20% by mass, 3% to 50% by mass, 3% to 40% by mass, 3% to 30% by mass, 3% to 20% by mass, 5% to 50% by mass, 5% to 40% by mass, 5% to 30% by mass, 5% to 20% by mass, 10% to 50% by mass, 10% to 40% by mass, 10% to 30% by mass, or 10% to 20% by mass, for example.

The thermoplastic resin is not particularly limited as long as it is a resin to which hot plate welding can be applied, and may be selected from the group consisting of an ABS resin (acrylonitrile-butadiene-styrene copolymer), an ASA resin (acrylonitrile-ethylene-propylene-based rubber-styrene copolymer), an AES resin (acrylonitrile-ethylene-propylene-based rubber-styrene copolymer resin), and a SAN resin (styrene-acrylonitrile copolymer), for example, from the viewpoint of excellent compatibility with the stringing inhibitor. For the thermoplastic resin, one type may be used alone, or two or more types thereof may be used in combination.

(Resin Composition)

A resin composition of the present embodiment contains the above-mentioned maleimide-based copolymer (stringing inhibitor) and a thermoplastic resin.

The content of the maleimide-based copolymer in the resin composition may be, for example, 1% by mass or more, and from the viewpoint of significantly inhibiting the stringing phenomenon, the content is preferably 3% by mass or more, is more preferably 5% by mass or more, and is further preferably 10% by mass or more. In addition, the content of the maleimide-based copolymer in the resin composition may be, for example, 50% by mass or less, and from the viewpoint of further improving impact resistance, the content is preferably 40% by mass or less, is more preferably 30% by mass or less, and is further preferably 20% by mass or less. That is, the content of the maleimide-based copolymer in the resin composition may be 1% to 50% by mass, 1% to 40% by mass, 1% to 30% by mass, 1% to 20% by mass, 3% to 50% by mass, 3% to 40% by mass, 3% to 30% by mass, 3% to 20% by mass, 5% to 50% by mass, 5% to 40% by mass, 5% to 30% by mass, 5% to 20% by mass, 10% to 50% by mass, 10% to 40% by mass, 10% to 30% by mass, or 10% to 20% by mass, for example.

The thermoplastic resin is not particularly limited as long as it is a resin to which hot plate welding can be applied, and may be selected from the group consisting of an ABS resin (acrylonitrile-butadiene-styrene copolymer), an ASA resin (acrylonitrile-ethylene-propylene-based rubber-styrene copolymer), an AES resin (acrylonitrile-ethylene-propylene-based rubber-styrene copolymer resin), and a SAN resin (styrene-acrylonitrile copolymer), for example, from the viewpoint of excellent compatibility with the stringing inhibitor. For the thermoplastic resin, one type may be used alone, or two or more types thereof may be used in combination.

The content of the thermoplastic resin in the resin composition may be, for example, 50% by mass or more, and from the viewpoint of further improving impact resistance, the content is preferably 60% by mass or more, is more preferably 70% by mass or more, and is further preferably 80% by mass or more. In addition, the content of the thermoplastic resin in the resin composition may be, for example, 99% by mass or less, and from the viewpoint of significantly inhibiting the stringing phenomenon, the content is preferably 97% by mass or less, is more preferably 95% by mass or less, is further preferably 90% by mass or less. That is, the content of the thermoplastic resin in the resin composition may be 50% to 99% by mass, 50% to 97% by mass, 50% to 95% by mass, 50% to 90% by mass, 60% to 99% by mass, 60% to 97% by mass, 60% to 95% by mass, 60% to 90% by mass, 70% to 99% by mass, 70% to 97% by mass, 70% to 95% by mass, 70% to 90% by mass, 80% to 99% by mass, 80% to 97% by mass, 80% to 95% by mass, or 80% to 90% by mass, for example.

The resin composition of the present embodiment can be suitably used for hot plate welding because the stringing phenomenon is inhibited by blending the maleimide-based copolymer. That is, the resin composition of the present embodiment may be a resin composition for hot plate welding.

The resin composition of the present embodiment preferably has an excellent color tone (that is, a low yellowness index (YI)). The yellowness index (YI) of the resin composition is 50 or less, is preferably 40 or less, and is more preferably 35 or less, for example.

In addition, in the present specification, the yellowness index (YI) of the resin composition is measured using a color-difference meter.

The resin composition of the present embodiment preferably has excellent impact resistance (that is, high Charpy impact strength). The Charpy impact strength of the resin composition is 10 kJ/m$^2$ or more, is preferably 15 kJ/m$^2$ or more, and is more preferably 20 kJ/m$^2$ or more, for example. The upper limit of the Charpy impact strength is not particularly limited. The Charpy impact strength of the resin composition may be 80 kJ/m$^2$ or less, 60 kJ/m$^2$ or less, or 40 kJ/m$^2$ or less, for example. That is, the Charpy impact strength of the resin composition may be 10 to 80 kJ/m$^2$, 10 to 60 kJ/m$^2$, 10 to 40 kJ/m$^2$, 15 to 80 kJ/m$^2$, 15 to 60 kJ/m$^2$, 15 to 40 kJ/m$^2$, 20 to 80 kJ/m$^2$, 20 to 60 kJ/m$^2$, or 20 to 40 kJ/m$^2$, for example.

In the present specification, the Charpy impact strength of the resin composition is measured by a method conforming to JIS K-7111.

The resin composition of the present embodiment preferably has excellent flowability (that is, a large value of a melt mass-flow rate). The melt mass-flow rate of the resin composition is 1 g/10 min or more, is preferably 3 g/10 min or more, and is more preferably 5 g/10 min or more, for example. The upper limit of the melt mass-flow rate is not particularly limited. The melt mass-flow rate of the resin composition may be 40 g/10 min or less, 30 g/10 min or less, or 25 g/10 min or less, for example. That is, the melt mass-flow rate of the resin composition may be 1 to 40 g/10 min, 1 to 30 g/10 min, 1 to 25 g/10 min, 3 to 40 g/10 min, 3 to 30 g/10 min, 3 to 25 g/10 min, 5 to 40 g/10 min, 5 to 30 g/10 min, or 5 to 25 g/10 min, for example.

In the present specification, the melt mass-flow rate of the resin composition indicates a value measured under the conditions of 220° C. and a load of 98 N in accordance with JIS K 7210.

The resin composition of the present embodiment preferably has excellent heat resistance (that is, a high Vicat softening point). The Vicat softening point of the resin composition is 104° C. or higher, is preferably 106° C. or higher, and is more preferably 108° C. or higher, for example. Although the upper limit of the Vicat softening point is not particularly limited, it may be, for example, 130° C. or lower, 125° C. or lower, or 120° C. or lower from the viewpoint of enabling lowering of the temperature at the time of hot plate welding, and excellent workability. That is, the Vicat softening point of the resin composition may be 104° C. to 130° C., 104° C. to 125° C., 104° C. to 120° C., 106° C. to 130° C., 106° C. to 125° C., 106° C. to 120° C., 108° C. to 130° C., 108° C. to 125° C., or 108° C. to 120° C., for example.

In the present specification, the Vicat softening point of the resin composition indicates a value measured by a 50 method (load: 50 N, temperature rising rate: 50° C./hour) in accordance with JIS K 7206.

The resin composition of the present embodiment may further contain components other than the maleimide-based copolymer and the thermoplastic resin. Examples of the other components include impact resistance modifying materials, flowability modifying materials, hardness modifying materials, antioxidants, matting agents, flame retardants, flame retardant auxiliaries, anti-drip agents, slidability imparting agents, plasticizers, lubricants, release agents, ultraviolet absorbers, light stabilizers, antibacterial agents, antifungal agents, antistatic agents, pigments, and dyes.

The resin composition of the present embodiment may be mixed with an inorganic material to be used as a composite material. Examples of inorganic materials include inorganic fillers such as glass fibers, talc, and mica, heat dissipation materials, and electromagnetic wave absorbers. Examples of inorganic materials further include carbon black, titanium oxide, and pigments.

A method for manufacturing the resin composition of the present embodiment is not particularly limited, and can be manufactured by mixing each of the above-mentioned components at high temperature, for example.

The temperature at the time of mixing may be any temperature as long as it is a temperature at which the maleimide-based copolymer and the thermoplastic resin can be flowed and mixed.

A mixing method is not particularly limited, and can be appropriately selected from known methods in which a single-screw extruder, a twin-screw extruder, a Banbury mixer, a kneader, and the like are used, for example.

The resin composition of the present embodiment can be used alone or as a composite material mixed with an inorganic material to manufacture a resin molded product. That is, a resin molded product is manufactured by flowing the resin composition of the present embodiment at a high temperature and molding it.

The temperature at the time of molding may be any temperature as long as it is a temperature at which the resin composition can flow and be molded. For example, when the Vicat softening point of the resin composition is $V_1$ (° C.), the molding temperature is preferably $V_1+100°$ C. or higher, is more preferably $V_1+120°$ C. or higher, and is further preferably $V_1+130°$ C. or higher. In addition, the molding temperature may be $V_1+170°$ C. or lower, is preferably $V_1+160°$ C. or lower, and is more preferably $V_1+150°$ C. or lower, for example. That is, the molding temperature may be $V_1+100°$ C. to $V_1+170°$ C., $V_1+100°$ C. to $V_1+160°$ C., $V_1+100°$ C. to $V_1+150°$ C., $V_1+120°$ C. to $V_1+170°$ C., $V_1+120°$ C. to $V_1+160°$ C., $V_1+120°$ C. to $V_1+150°$ C., $V_1+130°$ C. to $V_1+170°$ C., $V_1+130°$ C. to $V_1+160°$ C., or $V_1+130°$ C. to $V_1+150°$ C., for example.

A molding method is not particularly limited, and can be appropriately selected from known molding methods such as extrusion molding, injection molding, blow molding, and foam molding. Since the resin composition of the present embodiment has excellent flowability at high temperatures, it has excellent moldability and is particularly suitable for injection molding.

Usage applications of the resin molded product containing the resin composition of the present embodiment are not particularly limited, and for example, the resin molded product can be suitably used for usage applications such as automotive interior and exterior components, home electric appliances, office equipment components, and building materials.

The resin composition of the present embodiment can be suitably used for hot plate welding. For example, the resin molded product containing the resin composition of the present embodiment can be easily adhered to another member or the like by hot plate welding on the resin surface containing the resin composition of the present embodiment. The conditions for hot plate welding are not particularly limited, and for example, the conditions described in the method for manufacturing a molded product to be described later, and the like can be used as appropriate.

(Method for Manufacturing Molded Product)

The method for manufacturing a molded product according to the present embodiment includes a step of joining a first resin surface and a second resin surface to each other by hot plate welding. In the present embodiment, at least one of the first resin surface and the second resin surface contains the above-mentioned resin composition. This inhibits the stringing phenomenon at the time of hot plate welding in the resin surface containing the above-mentioned resin composition.

In the present embodiment, only one of the first resin surface and the second resin surface may contain the above-mentioned resin composition, and both the first resin surface and the second resin surface may contain the above-mentioned resin composition.

The first resin surface and the second resin surface are preferably surfaces mainly composed of the above-mentioned resin composition (for example, 90% by mass or more, preferably 95% by mass or more).

When $V_1$ (° C.) is the Vicat softening point of the resin material (for example, the above-mentioned resin composition) constituting the resin surface, the temperature at the time of hot plate welding may be, for example, $V_1+125°$ C. or higher, and from the viewpoint of shortening a hot plate welding processing time, the temperature is preferably $V_1+130°$ C. or higher, is more preferably $V_1+135°$ C. or higher, and is further preferably $V_1+140°$ C. or higher. In addition, the temperature at the time of hot plate welding may be, for example, $V_1+170°$ C. or lower, and from the viewpoint of preventing hot plate contamination, the temperature is preferably $V_1+165°$ C. or lower, and is more preferably $V_1+160°$ C. or lower. That is, the temperatures at the time of hot plate welding may be $V_1+125°$ C. to $V_1+170°$ C., $V_1+125°$ C. to $V_1+165°$ C., $V_1+125°$ C. to $V_1+160°$ C., $V_1+130°$ C. to $V_1+170°$ C., $V_1+130°$ C. to $V_1+165°$ C., $V_1+130°$ C. to $V_1+160°$ C., $V_1+135°$ C. to $V_1+170°$ C., $V_1+135°$ C. to $V_1+165°$ C., $V_1+135°$ C. to $V_1+160°$ C., $V_1+140°$ C. to $V_1+170°$ C., $V_1+140°$ C. to $V_1+165°$ C., or $V_1+140°$ C. to $V_1+160°$ C., for example.

According to the method for manufacturing a molded product of the present embodiment, a molded product is obtained, the molded product having a welded part at which the first resin surface and the second resin surface are welded, in which at least one of the first resin surface and the second resin surface contains the above-mentioned resin composition. Usage applications of such a molded product are not particularly limited, and for example, the molded product can be suitably used for usage applications such as automotive interior and exterior components, home electric appliances, office equipment components, and building materials.

Although the preferable embodiments of the present invention have been described above, the present invention is not limited to the above-mentioned embodiments.

EXAMPLES

The present invention will be described in more detail below with reference to examples, but the present invention is not limited to these examples.

Example 1-1

A maleimide-based copolymer A-1 was manufactured by the following method.

65 parts by mass of styrene, 7 parts by mass of maleic acid anhydride, 0.05 parts by mass of 2,4-diphenyl-4-methyl-1-pentene, and 25 parts by mass of methyl ethyl ketone, which is a non-polymerizable solvent, were charged in an autoclave having the volume of about 120 liters and equipped with a stirrer to replace the inside of the system with nitrogen gas, and thereafter the temperature was raised to 92° C. A solution in which 28 parts by mass of maleic acid anhydride and 0.3 parts by mass of t-butyl peroxy-2-ethyl-hexanoate were dissolved in 100 parts by mass of methyl ethyl ketone (non-polymerizable solvent) was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 32 parts by mass of aniline and 0.6 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer A-1 in the form of pellets.

The content of each of the monomer units, the residual monomer amount, the glass transition temperature, and the yellowness index of the obtained maleimide-based copolymer A-1 were measured by the following methods. Table 1 shows the results.

<Content of Each of Monomer Unit>

Measurement was performed by a $^{13}$C-NMR method using the following device and measurement conditions.
    Device name: JNM-ECX series FT-NMR (manufactured by JEOL Ltd.)
    Solvent: deuterated chloroform
    Concentration: 2.5% by mass
    Temperature: 27° C.
    Accumulated times: 8,000 times <Residual Monomer Amount>
(Aromatic Vinyl-Based Monomer)

0.3 to 0.4 g of the maleimide-based copolymer was weighed in a 50 mL Erlenmeyer flask and 10 mL of DMF containing an internal standard (cyclopentanol) was added and dissolved as pretreatment, thereby measuring the residual amount of the aromatic vinyl-based monomer under the following conditions.
    Device name: GC-12A (manufactured by Shimadzu Corporation)
    Detector: FID
    Column: 3 m glass column (filler: liquid phase PEG20M+TCEP (15+5))
    Temperature: INJ 150° C., DET 150° C., column 115° C.
    Injection volume: 1 μL (Maleimide-Based Monomer)

The residual amount of the maleimide-based monomer indicates a value measured under the following conditions.
    Device name: GC-2010 (manufactured by Shimadzu Corporation)
    Column: capillary column DB-5MS (phenylallene polymer)
    Temperature: temperature rising analysis was performed at an inlet temperature of 280° C., a detector temperature of 280° C., and a column temperature of 80° C. (initial stage).

(Temperature Rising Analysis Conditions)
    80° C.: holding for 0.12 minutes
    80 to 280° C.: temperature rising at 20° C./min for 10 minutes
    280° C.: holding for 10 minutes
    Detector: FID Procedure: 0.5 g of the maleimide-based copolymer was dissolved in 5 ml of a 1,2-dichloroethane solution (0.014 g/L) containing undecane (internal standard substance). Thereafter, 5 ml of n-hexane was added and shaken for 10 to 15 minutes with a shaker to precipitate. Only the supernatant solution was injected into GC in the state where the polymer was precipitated and deposited. An assay value was calculated from the obtained peak surface area of the monomer using the coefficient obtained from the internal standard substance.

<Glass Transition Temperature>

The glass transition temperature ($Tg_1$) refers to an extrapolated glass transition onset temperature (Tig) measured by the following device and measurement conditions in accordance with JIS K-7121.
    Device name: differential scanning calorimeter Robot DSC6200 (manufactured by Seiko Instruments Inc.)
    Temperature rising rate: 10° C./min <Yellowness Index>

Measurement was performed in accordance with JIS K-7373. The specific procedure is as follows.

1 g of a test piece was dissolved in 25 mL of tetrahydrofuran, and transferred to a square cell for measurement after dissolution. By a transmission method in which a CIE standard D65 light source was used under the conditions of the temperature of 23° C. and the humidity of 50%, the color difference was determined using the square cell of the tetrahydrofuran solution as a blank, and the value thereof was taken as the yellowness index.
    Device name: SE7700 spectral colorimeter (manufactured by NIPPON DENSHOKU INDUSTRIES CO., LTD.)
    Square cell: A02277A, 10×36×55H square cell, two-sided transmission

Example 1-2

A maleimide-based copolymer A-2 was manufactured by the following method.

65 parts by mass of styrene, 7 parts by mass of N-phenylmaleimide, 0.05 parts by mass of 2,4-diphenyl-4-methyl-1-pentene, and 25 parts by mass of methyl ethyl ketone were charged in an autoclave having the volume of about 120 liters and equipped with a stirrer to replace the gas phase with nitrogen gas, and thereafter the temperature was raised to 92° C. over 40 minutes while stirring. A solution in which 28 parts by mass of N-phenylmaleimide and 0.3 parts by mass of t-butyl peroxy-2-ethylhexanoate were dissolved in 100 parts by mass of methyl ethyl ketone was continuously added over 8 hours while maintaining the temperature at 92° C. after raising the temperature. After the addition, 0.04 part by mass of t-butylperoxy-2-ethylhexanoate was further added, the temperature was raised to 120° C., and the reaction was caused for 1 hour to complete the polymerization. The polymerization liquid after completion of the reaction was injected into a vent-type screw extruder to remove a volatile-matter content, thereby obtaining a maleimide-based copolymer A-2 in the form of pellets. Table 1 shows the analytical results of the obtained maleimide-based copolymer A-2.

Example 1-3

A maleimide-based copolymer A-3 was manufactured by the following method.

65 parts by mass of styrene, 7 parts by mass of maleic acid anhydride, 0.05 parts by mass of 2,4-diphenyl-4-methyl-1-pentene, and 25 parts by mass of methyl ethyl ketone were charged in an autoclave having the volume of about 120 liters and equipped with a stirrer to replace the inside of the system with nitrogen gas, and thereafter the temperature was raised to 92° C. A solution in which 28 parts by mass of maleic acid anhydride and 0.4 parts by mass of t-butyl peroxy-2-ethylhexanoate were dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 32 parts by mass of aniline and 0.6 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer A-3 in the form of pellets. Table 1 shows the analytical results of the obtained maleimide-based copolymer A-3.

Example 1-4

A maleimide-based copolymer A-4 was manufactured by the following method.

55 parts by mass of styrene, 25 parts by mass of maleic acid anhydride, 0.05 parts by mass of 2,4-diphenyl-4-methyl-1-pentene, and 75 parts by mass of methyl ethyl ketone were charged in an autoclave having the volume of about 120 liters and equipped with a stirrer to replace the inside of the system with nitrogen gas, and thereafter the temperature was raised to 92° C. A solution in which 20 parts by mass of maleic acid anhydride and 0.2 parts by mass of t-butyl peroxy-2-ethylhexanoate were dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 41 parts by mass of aniline and 0.8 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer A-4 in the form of pellets. Table 1 shows the analytical results of the obtained maleimide-based copolymer A-4.

Example 1-5

A maleimide-based copolymer A-5 was manufactured by the following method.

75 parts by mass of styrene, 5 parts by mass of maleic acid anhydride, 0.15 parts by mass of 2,4-diphenyl-4-methyl-1-pentene, and 25 parts by mass of methyl ethyl ketone were charged in an autoclave having the volume of about 120 liters and equipped with a stirrer to replace the inside of the system with nitrogen gas, and thereafter the temperature was raised to 92° C. A solution in which 20 parts by mass of maleic acid anhydride and 0.5 parts by mass of t-butyl peroxy-2-ethylhexanoate were dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 23 parts by mass of aniline and 0.4 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer A-5 in the form of pellets. Table 1 shows the analytical results of the obtained maleimide-based copolymer A-5.

Example 1-6

A maleimide-based copolymer A-6 was manufactured by the following method.

67 parts by mass of styrene, 5 parts by mass of maleic acid anhydride, 7 parts by mass of acrylonitrile, 0.05 parts by mass of 2,4-diphenyl-4-methyl-1-pentene, and 25 parts by mass of methyl ethyl ketone were charged in an autoclave having the volume of about 120 liters and equipped with a stirrer to replace the inside of the system with nitrogen gas, and thereafter the temperature was raised to 92° C. A solution in which 21 parts by mass of maleic acid anhydride and 0.2 parts by mass of t-butyl peroxy-2-ethylhexanoate were dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 24 parts by mass of aniline and 0.4 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer A-6 in the form of pellets. Table 1 shows the analytical results of the obtained maleimide-based copolymer A-6.

Comparative Example 1-1

A maleimide-based copolymer X-1 was manufactured by the following method.

65 parts by mass of styrene, 7 parts by mass of maleic acid anhydride, 0.05 parts by mass of 2,4-diphenyl-4-methyl-1-pentene, and 25 parts by mass of methyl ethyl ketone were charged in an autoclave having the volume of about 120 liters and equipped with a stirrer to replace the inside of the system with nitrogen gas, and thereafter the temperature was raised to 92° C. A solution in which 28 parts by mass of maleic acid anhydride and 0.1 parts by mass of t-butyl peroxy-2-ethylhexanoate were dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 32 parts by mass of aniline and 0.6 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer X-1 in the form of pellets. Table 1 shows the analytical results of the obtained maleimide-based copolymer X-1.

Comparative Example 1-2

A maleimide-based copolymer X-2 was manufactured by the following method.

80 parts by mass of styrene, 4 parts by mass of maleic acid anhydride, 0.3 parts by mass of 2,4-diphenyl-4-methyl-1-pentene, and 25 parts by mass of methyl ethyl ketone were charged in an autoclave having the volume of about 120 liters and equipped with a stirrer to replace the inside of the system with nitrogen gas, and thereafter the temperature was raised to 92° C. A solution in which 16 parts by mass of maleic acid anhydride and 0.5 parts by mass of t-butyl peroxy-2-ethylhexanoate were dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 18 parts by mass of aniline and 0.3 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer X-2 in the form of pellets. Table 1 shows the analytical results of the obtained maleimide-based copolymer X-2.

Comparative Example 1-3

A maleimide-based copolymer X-3 was manufactured by the following method.

65 parts by mass of styrene, 7 parts by mass of maleic acid anhydride, 0.05 parts by mass of 2,4-diphenyl-4-methyl-1-pentene, and 25 parts by mass of methyl ethyl ketone were charged in an autoclave having the volume of about 120 liters and equipped with a stirrer to replace the inside of the system with nitrogen gas, and thereafter the temperature was raised to 92° C. A solution in which 28 parts by mass of maleic acid anhydride and 0.6 parts by mass of t-butyl peroxy-2-ethylhexanoate were dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 32 parts by mass of aniline and 0.6 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer X-3 in the form of pellets. Table 1 shows the analytical results of the obtained maleimide-based copolymer X-3.

Comparative Example 1-4

A maleimide-based copolymer X-4 was manufactured by the following method.

50 parts by mass of styrene, 50 parts by mass of maleic acid anhydride, 0.05 parts by mass of 2,4-diphenyl-4-methyl-1-pentene, and 75 parts by mass of methyl ethyl ketone were charged in an autoclave having the volume of about 120 liters and equipped with a stirrer to replace the inside of the system with nitrogen gas, and thereafter the temperature was raised to 92° C. A solution in which 0.1 parts by mass of t-butyl peroxy-2-ethylhexanoate was dissolved in 100 parts by mass of methyl ethyl ketone was continuously added over 8 hours. After the addition, 0.04 part by mass of t-butylperoxy-2-ethylhexanoate was further added, the temperature was raised to 120° C., and the reaction was caused for 1 hour to complete the polymerization. Thereafter, 46 parts by mass of aniline and 0.9 parts by mass of triethylamine were added to the polymerization liquid and reacted at 140° C. for 7 hours. The imidization reaction solution after completion of the reaction was injected into a vent-type screw extruder to remove a volatile-matter content, thereby obtaining a maleimide-based copolymer X-4 in the form of pellets. Table 1 shows the analytical results of the obtained maleimide-based copolymer X-4.

TABLE 1

| | | | | Example | | | | | | Comparative Example | | | |
|---|---|---|---|---|---|---|---|---|---|---|---|---|---|
| | | | | 1-1 | 1-2 | 1-3 | 1-4 | 1-5 | 1-6 | 1-1 | 1-2 | 1-3 | 1-4 |
| Charged ratio | Initial stage | Aromatic vinyl-based monomer | [part by mass] | 65 | 65 | 65 | 55 | 75 | 67 | 65 | 80 | 65 | 50 |
| | | Unsaturated dicarboxylic acid-based monomer | [part by mass] | 7 | — | 7 | 25 | 5 | 5 | 7 | 4 | 7 | 50 |
| | | Maleimide-based monomer | [part by mass] | — | 7 | — | — | — | — | — | — | — | — |
| | | Vinyl cyanide-based monomer | [part by mass] | — | — | — | — | — | 7 | — | — | — | — |
| | | Non-polymerizable solvent | [part by mass] | 25 | 25 | 25 | 75 | 25 | 25 | 25 | 25 | 25 | 125 |
| | Additionally added | Unsaturated dicarboxylic acid-based monomer | [part by mass] | 28 | — | 28 | 20 | 20 | 21 | 28 | 16 | 28 | — |
| | | Maleimide-based monomer | [part by mass] | — | 28 | — | — | — | — | — | — | — | — |
| | | Non-polymerizable solvent | [part by mass] | 100 | 100 | 100 | 100 | 100 | 100 | 100 | 100 | 100 | — |
| Unreacted amount of aromatic vinyl-based monomer | | | [% by mass] | 0.9 | 1.5 | 0.6 | 0.4 | 1.7 | 1.4 | 3.2 | 0.5 | 0.2 | 0.3 |
| Unreacted amount of unsaturated dicarboxylic acid-based monomer | | | [% by mass] | 0.013 | — | 0.007 | 0.020 | 0.005 | 0.012 | 0.028 | 0.002 | 0.006 | 0.900 |

TABLE 1-continued

|  |  | Example | | | | | | Comparative Example | | | |
| --- | --- | --- | --- | --- | --- | --- | --- | --- | --- | --- | --- |
|  |  | 1-1 | 1-2 | 1-3 | 1-4 | 1-5 | 1-6 | 1-1 | 1-2 | 1-3 | 1-4 |
| Unreacted amount of maleimide-based monomer unit | [% by mass] | — | 0.018 | — | — | — | — | — | — | — | — |
| Unreacted amount of vinyl cyanide-based monomer | [% by mass] | — | — | — | — | — | 0.23 | — | — | — | — |
| Constituent unit — Aromatic vinyl-based monomer unit | [% by mass] | 50 | 51 | 51 | 41 | 61 | 56 | 49 | 67 | 52 | 37 |
| Maleimide-based monomer unit | [% by mass] | 49 | 49 | 48 | 57 | 38 | 37 | 50 | 32 | 47 | 61 |
| Unsaturated dicarboxylic acid-based monomer unit | [% by mass] | 1 | — | 1 | 2 | 1 | 1 | 1 | 1 | 1 | 2 |
| Vinyl cyanide-based monomer unit | [% by mass] | — | — | — | — | — | 6 | — | — | — | — |
| Residual amount of aromatic vinyl-based monomer | [ppm by mass] | 820 | 1190 | 700 | 490 | 1590 | 1210 | 2390 | 610 | 180 | 290 |
| Residual amount of maleimide-based monomer | [ppm by mass] | 190 | 280 | 140 | 290 | 70 | 180 | 430 | 20 | 80 | 3900 |
| Glass transition temperature | [° C.] | 192 | 190 | 191 | 208 | 161 | 162 | 191 | 143 | 190 | 213 |
| Yellowness index | — | 1.8 | 19 | 1.6 | 2.3 | 12 | 1.9 | 3.1 | 1.1 | L.5 | 11.5 |

Example 2-1

A resin composition was obtained by the following method.

15% by mass of the maleimide-based copolymer (A-1) obtained above and 85% by mass of a commonly available ABS resin "GR-3000" (manufactured by Denka Company Limited) were mixed and extruded using a twin-screw extruder TEM-35B (manufactured by Toshiba Machine Co., Ltd.) to obtain a pelletized resin composition.

The obtained resin composition was evaluated by the following method. Table 2 shows the results.

<Evaluation of Stringing Properties>

For stringing properties, a test piece having the dimensions of 80 mm×10 mm×4 mm used in a bending test of JIS K-7171 was used to be pressed against a hot plate at 250° C. with the load of 1 kg for 10 seconds, and thereafter the stringing length at the time of pulling up at the rate of 10 cm/see was evaluated according to the following five grades.

AA: a string was cut at 1.0 cm or less.
A: cut at 1.0 cm to 4.0 cm.
B: cut at 4.0 cm to 10.0 cm.
C: a string of 10 cm or longer.

<Measurement of Yellowness Index (YI)>

A plate (9 cm×5 cm) was molded at the molding temperature of 240° C. by an injection molding machine (IS-50EP, manufactured by Toshiba Machine Co., Ltd.) to measure the yellowness index YI by a color-difference meter (COLOR-7e², manufactured by KURABO INDUSTRIES LTD.).

<Measurement of Volatile-Matter Content>

The same measurement as in the measurement of <Residual monomer amount> of the aromatic vinyl-based monomer and the maleimide-based monomer of the maleimide-based copolymer was performed, and the total amount was taken as a volatile-matter content.

<Measurement of Charpy Impact Strength>

Measurement was performed at the relative humidity of 50% and the atmospheric temperature of 23° C. by using a notched test piece and adopting edgewise as the impact direction in accordance with JIS K-7111. A digital impact tester manufactured by Toyo Seiki Seisaku-sho, Ltd. was used as the measurement machine.

<Measurement of Melt Mass-Flow Rate>

Measurement was performed at 220° C. and the load of 98 N in accordance with JIS K 7210.

<Measurement of Vicat Softening Point>

Measurement was performed using a test piece with 10 mm×10 mm×4 mm by a 50 method (load: 50 N, temperature rising rate: 50° C./hour) in accordance with JIS K 7206. A HDT & VSPT test device manufactured by Toyo Seiki Seisaku-sho, Ltd. was used as a measurement machine.

Examples 2-2 to 2-6

A resin composition was obtained in the same manner as in Example 2-1 except that a maleimide-based copolymer A-2, A-3, A-4, A-5, or A-6 was used instead of the maleimide-based copolymer A-1. The obtained resin composition was evaluated in the same method as in Example 2-1. Table 2 shows the results.

Comparative Examples 2-1 to 2-4

A resin composition was obtained in the same manner as in Example 2-1 except that a maleimide-based copolymer X-1, X-2, X-3, or X-4 was used instead of the maleimide-based copolymer A-1. The obtained resin composition was evaluated in the same method as in Example 2-1. Table 2 shows the results.

TABLE 2

|  |  | Example | | | | | | Comparative Example | | | |
| --- | --- | --- | --- | --- | --- | --- | --- | --- | --- | --- | --- |
|  |  | 2-1 | 2-2 | 2-3 | 2-4 | 2-5 | 2-6 | 2-1 | 2-2 | 23 | 2-4 |
| Stringing properties | — | A | AA | A | A | AA | AA | AA | C | C | AA |
| Color tone (Yellowness index YI) | — | 28 | 32 | 25 | 38 | 22 | 33 | 48 | 20 | 25 | 56 |
| Volatile-matter content | ppm | 480 | 680 | 390 | 430 | 730 | 630 | 1300 | 250 | 140 | 2900 |
| Charpy impact strength | kJ/m² | 26 | 23 | 21 | 18 | 24 | 27 | 19 | 34 | 28 | 7 |

TABLE 2-continued

|  |  | Example | | | | | | Comparative Example | | | |
| --- | --- | --- | --- | --- | --- | --- | --- | --- | --- | --- | --- |
|  |  | 2-1 | 2-2 | 2-3 | 2-4 | 2-5 | 2-6 | 2-1 | 2-2 | 23 | 2-4 |
| Melt mass-flow rate | g/10 min | 6 | 5 | 7 | 3 | 9 | 8 | 6 | 11 | 6 | 2 |
| Vicat softening point | ° C. | 110 | 109 | 110 | 111 | 107 | 108 | 109 | 105 | 110 | 112 |

The invention claimed is:

1. A maleimide-based copolymer comprising:

40% to 65% by mass of an aromatic vinyl-based monomer unit;

35% to 60% by mass of a maleimide-based monomer unit, and 0.1% to 10% by mass of an unsaturated dicarboxylic acid-based monomer unit, wherein a residual amount of an aromatic vinyl-based monomer is 200 to 2000 ppm by mass, and a residual amount of a maleimide-based monomer is 30 to 400 ppm by mass.

2. The maleimide-based copolymer according to claim 1, further comprising a vinyl cyanide-based monomer unit, wherein the content of the vinyl cyanide-based monomer unit is 5% to 20% by mass.

3. A stringing inhibitor comprising the maleimide-based copolymer according to claim 1, wherein the stringing inhibitor inhibits stringing of a resin composition when performing hot plate welding.

4. A resin composition comprising:

the maleimide-based copolymer according to claim 1; and a thermoplastic resin.

5. The resin composition according to claim 4, wherein the content of the maleimide-based copolymer is 5% to 40% by mass, and the content of the thermoplastic resin is 60% to 95% by mass.

6. The resin composition according to claim 4, wherein the resin composition is for hot plate welding.

7. A method for manufacturing a molded product, the method comprising a step of joining a first resin surface and a second resin surface to each other by hot plate welding, wherein at least one of the first resin surface and the second resin surface contains the resin composition according to claim 4.

8. A molded product comprising a welded part at which a first resin surface and a second resin surface are welded, wherein at least one of the first resin surface and the second resin surface contains the resin composition according to claim 4.

* * * * *